United States Patent [19]

Miller

[11] 4,072,049

[45] Feb. 7, 1978

[54] APPARATUS FOR MEASURING SURFACE PRESSURES ON SPINNING AERODYNAMIC BODIES

[75] Inventor: Miles C. Miller, Joppatowne, Md.

[73] Assignee: The United States of America as represented by the Secretary of the Army, Washington, D.C.

[21] Appl. No.: 788,067

[22] Filed: Apr. 15, 1977

[51] Int. Cl.² ............................ G01M 9/00; G01L 7/00
[52] U.S. Cl. ........................................ 73/147; 73/714; 73/756
[58] Field of Search ............... 73/389, 212, 147, 182, 73/167, 420

[56] References Cited

U.S. PATENT DOCUMENTS

| 2,977,793 | 4/1961 | Bucalo | 73/212 |
| 3,400,584 | 9/1968 | Beilman | 73/182 |
| 3,699,811 | 10/1972 | Maiden | 73/212 |

*Primary Examiner*—Donald O. Woodiel
*Attorney, Agent, or Firm*—Nathan Edelberg; Robert P. Gibson; Saul Elbaum

[57] ABSTRACT

Measuring apparatus including a core, interior to and stationary relative to a spinning shell, having a cavity in sliding seal engagement with the interior of the spinning shell. The cavity is axially aligned with an aperture in the surface of the spinning shell, captures fluid pressure when the cavity and aperture are radially aligned and transmits the pressure to a transducer exterior to the aerodynamic test chamber.

10 Claims, 6 Drawing Figures

U.S. Patent  Feb. 7, 1978  Sheet 1 of 3  4,072,049

APPARATUS FOR MEASURING SURFACE PRESSURES ON SPINNING AERODYNAMIC BODIES

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates to apparatus for measuring the aerodynamic pressure distribution acting on the surface of the spinning wind tunnel model.

The so-called "Magnus effect" refers to the aerodynamic forces and moments acting on a spinning body whose flight direction is not aligned with its axis of spin. The Magnus phenomena are of particular importance in the ordnance field. In the case of spin stabilized projectiles, for example, the combination of projectile spin and angle of attack results in a Magnus force and moment which often degrade their flight performance. Although the Magnus effects are small as compared to the non-spinning static aerodynamic forces and moments, they often have a significant influence on the projectile stability and consequent flight motion and trajectory. The Magnus effect has been cited as the cause of the poor performance and failures of several projectile-based weapon systems.

The Magnus phenomena have been extensively investigated by both theoretical and experimental means as noted by I. D. Jacobson in AGARDograph, No. 171, November, 1973. However, quantitative experimental data have been limited to force and moment type measurements either obtained directly from wind tunnels or indirectly from ballistic ranges. While providing useful information with regard to the projectile flight stability and trajectory, they often do not give a detailed insight into the cause of the resulting forces and moments.

Additional knowledge concerning the Magnus effect could be gained by the experimental determination of the surface pressures acting on spinning bodies. If such data were available, it might provide a better understanding of the Magnus phenomena and would be an invaluable aid toward evolving a theoretical fluid dynamic model.

Experimental determination of the pressure distribution acting on the surface of a wind tunnel model is a basic and vital step in the design and analysis of aircraft, missiles, and other aerodynamic devices. Yet, up to now, these tests have always been limited to non-spinning conditions. The complete pressure distribution acting on the surface of a spinning body has never been experimentally obtained, even for the most simple cases.

Pressure measurements near the surface of spinning bodies can be obtained by simple static and total head pressure probes. However, their alignment with the local air flow direction and their proximity to the body surface is critical. Also, the body surface must not contain any protuberance which could physically interfere with the probes. In addition, the probe itself can create local flow disturbances which could effect the validity of the measured data. Thus there exists a need for instrumentation which can accurately measure the surface pressure on a spinning aerodynamic body without interfering with or disturbing the aerodynamic flow near the body.

SUMMARY OF THE INVENTION

The present invention is an apparatus for measuring the surface pressure on a spinning body in an aerodynamic chamber. The apparatus includes a shell having a configuration of the body under study and at least one aperture on the surface of the shell. The shell is rotatable about a core interior to such shell and said core includes a cavity in a sliding sealed engagement with the interior of the spinning shell. The cavity is aligned along the longitudinal axis of the spinning shell with the aperture and captures fluid pressure when the cavity and the aperture are radially aligned. The captured pressure is transmitted to a pressure transducer exterior to the aerodynamic test chamber. The cavity in the core may be adjusted in a radial direction to define the point on the surface of the shell at which the surface pressure is being measured. The shell may include a plurality of apertures and the cavity in the core may be movable longitudinally within the shell to align the cavity with the respective aperture along the longitudinal axis of the shell. Similarly, the core may include a plurality of cavities being adjusted along the longitudinal axis to align with a plurality of apertures in the shell. The sliding seal may be an O-ring having a biasing spring forcing the O-ring into contact with the interior of the rotating shell. The seal may also be magnetic fluid held in place between the core and the rotating shell by magnetic means concentric with the cavity. The core and the shell are both adjustable relative to the longitudinal axis of the aerodynamic chamber to simulate varying angles of attack and yaw.

OBJECTS OF THE INVENTION

An object of the present invention is to provide apparatus for measuring pressure on the surface of a spinning model wherein all the elements of instrumentation are located within the model or outside the test chamber.

Another object is to provide instrumentation for aerodynamic chambers wherein there is no initial or dynamic loads acting on the pressure transducer.

Further object of the invention is to provide pressure instrumentation for aerodynamic chamber test wherein constant pressure readings were obtainable without requiring high response transducers.

Still another object is to provide surface pressure instrumentation which can be used in any speed regime, for example, subsonic, transonic, supersonic, and hypersonic velocities.

Still further object is to provide instrumentation for measuring the pressure along the surface of a spinning model in an aerodynamic chamber which will function with models having irregular external surface features.

A still even further object of the invention is to provide instrumentation which is capable of measuring surface pressure of a spinning body in aerodynamic chamber at any point on the surface without impeding or modifying the dynamics near the surface.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
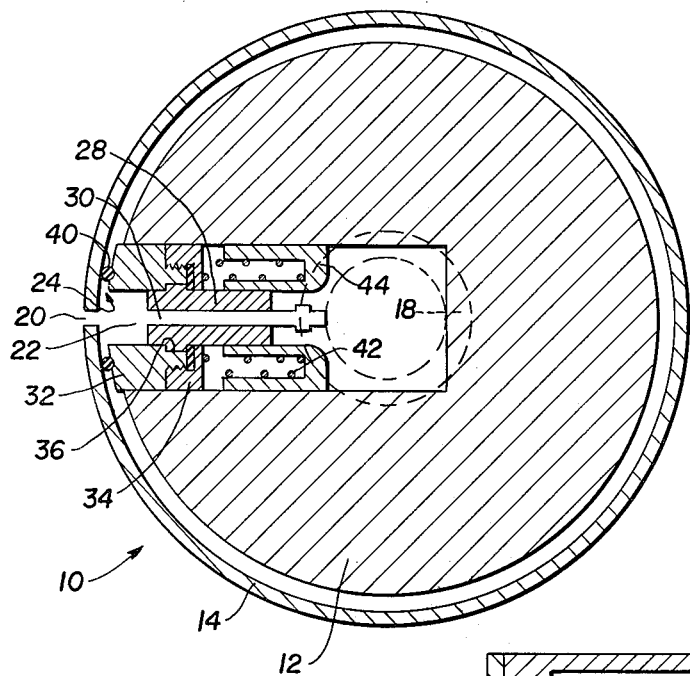
FIG. 1 is an end cross sectional view of an embodiment of the principle of the surface pressure measuring apparatus of the present invention.
Figure 2:
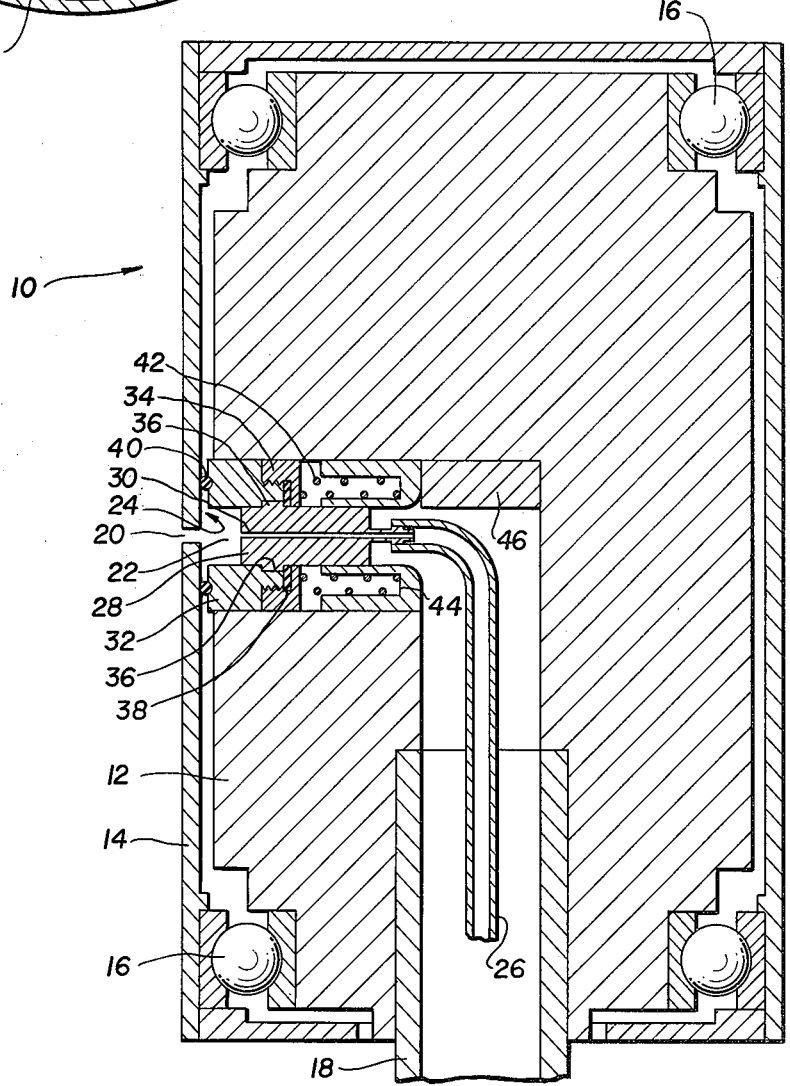
FIG. 2 is a side cross sectional view of the apparatus of FIG. 1.

FIGS. 1 and 2, which illustrate a preferred embodiment of the model 10 which includes apparatus for measuring surface pressure on a spinning aerodynamic body, show a core member 12 and a shell 14 rotatably attached to the core by bearings 16. The core 12 is fixed relative to the aerodynamic chamber by a strut 18. Through the surface of shell 14 is an aperture 20 and in the core 12 longitudinally aligned with the aperture 20 of the shell 14 is a cavity 22. The gap between the cavity 22 and the interior surface of shell 14 is sealed in all directions by means of a cylindrical cross section seal 24 located round and forming a portion of the wall of the cavity 22. A tube 26 connects the cavity 22 through the core 12 and strut 18 to a pressure transducer and associated instrumentation remote from the model 10. Since the cavity is mounted in the fixed core, direct tube connection is possible.

The cavity 22 located in the core 12 is oriented radially outward at a fixed angle relative to the direction of the crossflow in an aerodynamic test chamber. The angle of the cavity 22 defines the point on the model at which the pressure is being measured. The aperture 20 on the spinning shell 14 aligns with the cavity 22 once every revolution and allows the cavity to capture the pressure of the fluid acting on the outside surface of the shell 14 when they are aligned radially. When aperture 20 rotates past the radial alignment with the cavity 22, the seal 24 will cause the cavity 22 to retain this pressure which is transmitted through tube 26 to a pressure transducer.

Since aperture 20 will be aligned radially with the cavity 22 for a very short period of time, several revolutions of the shell 14 are required in order to have the pressure in the cavity 22 reach a condition of equilibrium having a constant value equal to that acting on the surface of the shell 14. The pressure transducer being located outside of the aerodynamic chamber does not experience any acceleration loads and thus permits a very sensitive transducer to be used without having the accuracy of the transducer effected by dynamic motion. Also, since the pressure reading is constant, the transducer's response time is not critical.

Pressure measurements at various points on the surface of the spinning body can be obtained by positioning the core 12 and the cavity 22 therein at different angles relative to the air flow. This is accomplished by simply rotating the core 12 about its longitudinal axis to a particular angle and holding it there a sufficient amount of time to obtain a pressure measurement. By rotating the core by strut 18, the adjustment can be done while the model is in the aerodynamic chamber, the chamber is running and the model shell 14 is spinning, thus allowing a rapid survey of the surface pressure distribution to be made. Similarly, the strut should be adjustable relative to the air flow so as to simulate various angles of attack.

The details of the model 10 include a single piece metal core 12 being machined on the exterior for the bearing 16, centerbored to accommodate the strut 18 and having a radial bore to accommodate the cavity 22 and the sliding seal 24 and tubing 26 associated therewith. Cavity 22 is a space defined by a substantially cylindrical slug 28 having opening 30 therein to connect the cavity 22 with tubing 26 attached to the rear of element 28 by the nipple thereon. Sliding seal 24 includes a seal block 32 and a seal plate 34 threaded together about and engaging a circumferal shoulder 36 on the cylindrical slug 28. Gaskets are provided between the seal block 32 and seal plate 34 to form an air tight seal. The outer surface of seal block 32 is shaped to the contour of the inner surface of the shell 14 and then a somewhat circular groove is machined therein. An O-ring washer 40 placed in the machined groove provides a sliding seal between the shell 14 and the seal block 32. In actual practice, the O-ring being a "quad-ring" (a ring having a generally x cross section) is held in place by vacuum grease. Applying the vacuum grease between the O-ring and the interior of shell 14 also provided a lubricating effect. Sliding seal 24 was biased towards the inner surface of shell 14 by spring 42 concentric to the cylindrical slug 28 and held in place by spring block 44 and spacer 46.

Figure 3:
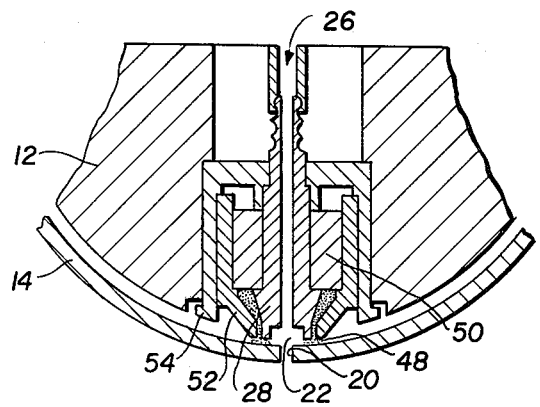
FIG. 3 is a partial cross sectional view of an alternative sliding seal.

Though rubber O-ring seal 40 has been found to be effective, rubbing friction and relative size inherent in the seal may impose limitation in this application with regard to maximum spin rate and minimum model size. Thus another seal is illustrated in FIG. 3 using a magnetic fluid held in place by a magnetic field. Magnetic fluid 48 consists of a colloidal suspension of ferrite particles in a carrier liquid which retain the chemical/mechanical characteristics of the carrier fluid. The cylindrical cavity base element or slug 28 is modified to accommodate a cylindrical shaped permanent magnet 50, pole block 52 and seal housing 54. The magnetic field of the cylindrical magnet 50 causes magnetic fluid 48 to assume a ring shape and hold its fluid in place between the outer tip of the pole block 52 and the inner surface of the shell 14. The ring shaped magnetic fluid 48 provides a seal which can hold a large pressure differential and has a very low coefficient of friction.

The cylindrical model 10 of FIG. 2 is shown as having a single aperture 20 and a single cavity 22. Obviously the model 10 may include a plurality of apertures 20 spaced along the longitudinal axis of the model and the core being movable along the longitudinal axis to align longitudinally with one of the apertures in the shell 14. Similarly, a plurality of cavities 22 could be provided at several locations along the longitudinal axis. In either case, the pressure distribution acting over the entire surface of the model can be measured.

Figure 4:
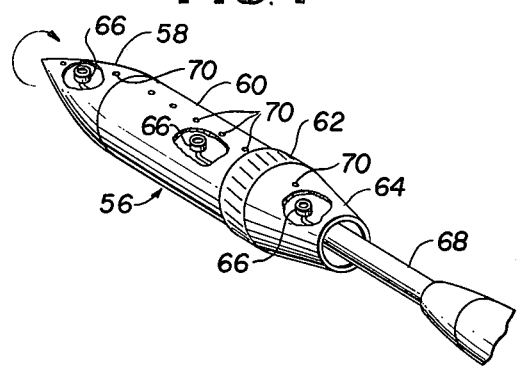
FIG. 4 is a prospective view of another embodiment of the principles of the present invention.

The model illustrated in FIG. 4 shows the approach of FIGS. 1 and 2 applied to a model of a spin stabilized artillery projectile. Model 56 includes a nose section 58, a body section 60, rotating band 62 and boat tail section 64. A plurality of cavities 66 are spaced longitudinally along the axis of model 56 and are connected to transducers exterior to the wind tunnel through sting mound 68. A plurality of vent holes 70 are also spaced along the longitudinal axis of the model 56 so that measurements by the three shown cavities 66 over the total exterior surface of the model may be made.

Figure 5:
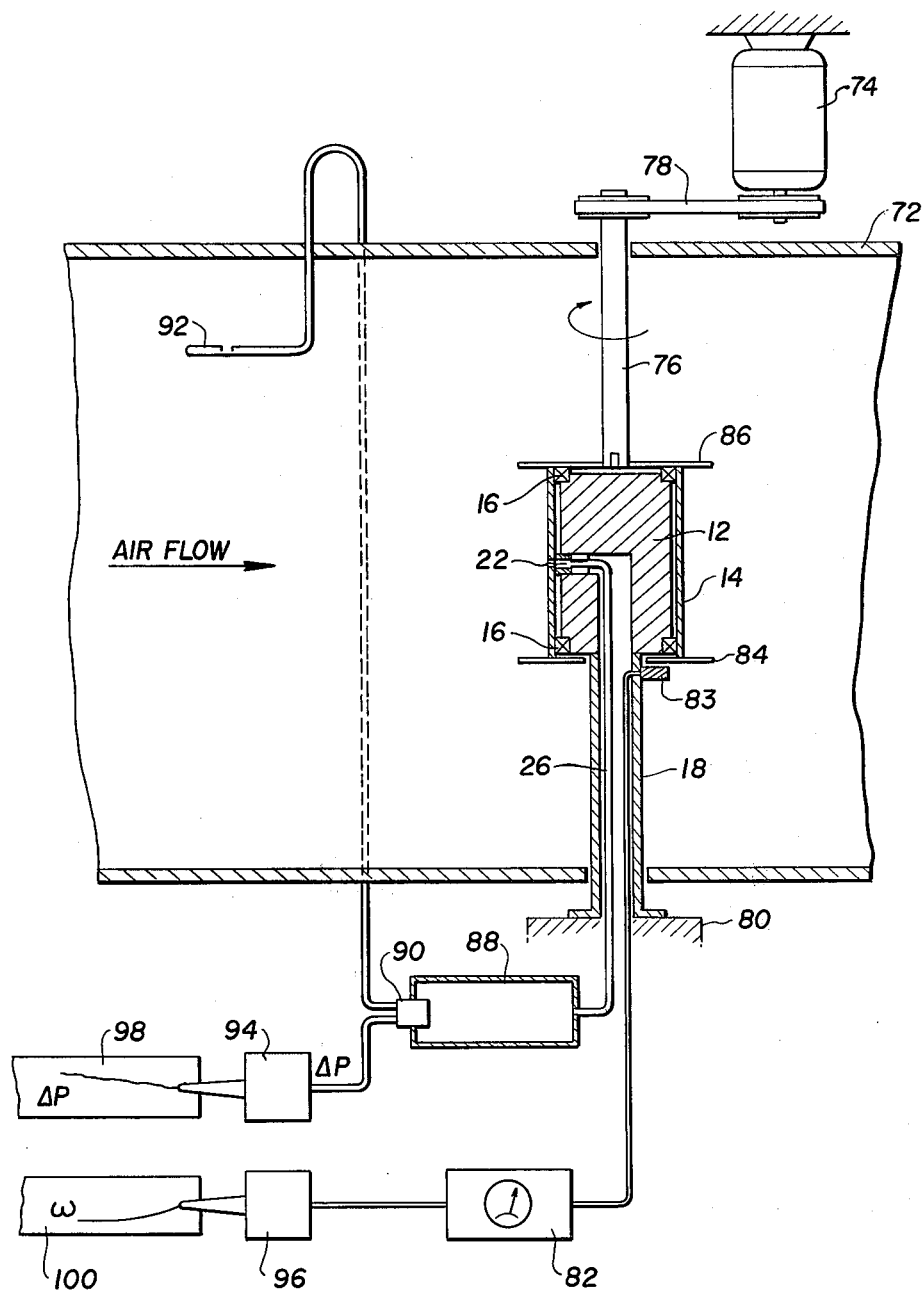
FIG. 5 is a diagram of the apparatus of FIG. 1 in use in an aerodynamic chamber.

FIG. 5 illustrates the model 10 of FIGS. 1 and 2 installed in an aerodynamic chamber or wind tunnel. The cylindrical model 10 is mounted in the wind tunnel 72 such that the longitudinal or spin axis is vertical. Model spin was obtained by means of an electric motor 74 mounted on top of the wind tunnel 72. A drive shaft 76 extending through the roof of the wind tunnel 72 to the top end of the shell 14 of the model 10 and is connected to the motor 74 by a belt and pulleys 78.

The model core 12 is mounted to the turntable 80 on the test section floor by strut 18 and includes its own motorized drive mechanism (not shown). A control box (not shown) located outside the tunnel 72 allows the turntable 80 to be rotated through 360 degrees and be set at any yaw angle within a 0.1° increment. This allows the core 12 and cavity 22 to be rapidly set at the desired angle relative to the air flow. Model spin rate is indicated by a magnetic tachometer 82 having a probe 83 mounted to the strut 18 beneath the lower end plate 84. Since only the air flow over the cylindrical portion of the model was of interest for the pressure tests, end plates 84 and 86 are added to effectively screen the ends of the model and eliminate any effect the presence of the drive shaft 76 and tachometer 83 would have on the pressure data.

The pressure in the cavity 22 is transmitted out of the model 10 by means of tubing 26. The combination of volume in the model cavity 22, the tubing 26, and the plenum cylinder 88 provided a sufficient volume reservoir to reduce any pressure transient or noise effects. Thus, the constant pressure in the model cavity 22 is the dominant pressure in the plenum cylinder 88. This pressure is measured by means of a transducer 90 located at the opposite end of the plenum cylinder 88. The transducer 90 measures the pressure in the model cavity 22 relative to the aerodynamic chamber static pressure. The reference pressure input to the transducer 90 is attached directly to a standard static pressure probe 92 located in the wind tunnel 72 upstream of the model 10. A relatively sensitive pressure transducer is required because of the low pressure characteristics.

One of the major advantages of this technique is that the transducer 90 is not subjected to a severe dynamic environment which would require a specially "hardened" transducer of decreased sensitivity. The fact that a constant pressure is being measured eliminates any requirements for high transducer response performance. The electronic signal from the transducer 90 and tachometer 82 are amplified by amplifiers 94 and 96 and traced out as a function of time on the strip chart recorders 98 and 100 respectively.

The reading of a constant pressure inherent in this technique simplified the overall instrumentation scheme in that the measuring instrumentation can be located outside of the aerodynamic chamber in an area free from dynamic and environmental effects which could degrade the performance of the instruments.

A procedure using the instrumentation illustrated in FIG. 5 would include first establishing the air flow in the aerodynamic chamber 72 at the desired velocity. The measurement of the pressure at various positions on the surface of the spinning model 10 is performed by turning on a motor 74 to drive the shell 14 up to a desired steady state spin rate. Then, core 12 is rotated by turntable 80 in five degree increments which require only a few seconds and held at each increment until the pressure reading stabilizes which also requires a few seconds. Thus the model in this manner provides a very rapid survey of the surface pressure over the circumference of the model.

Figure 6:
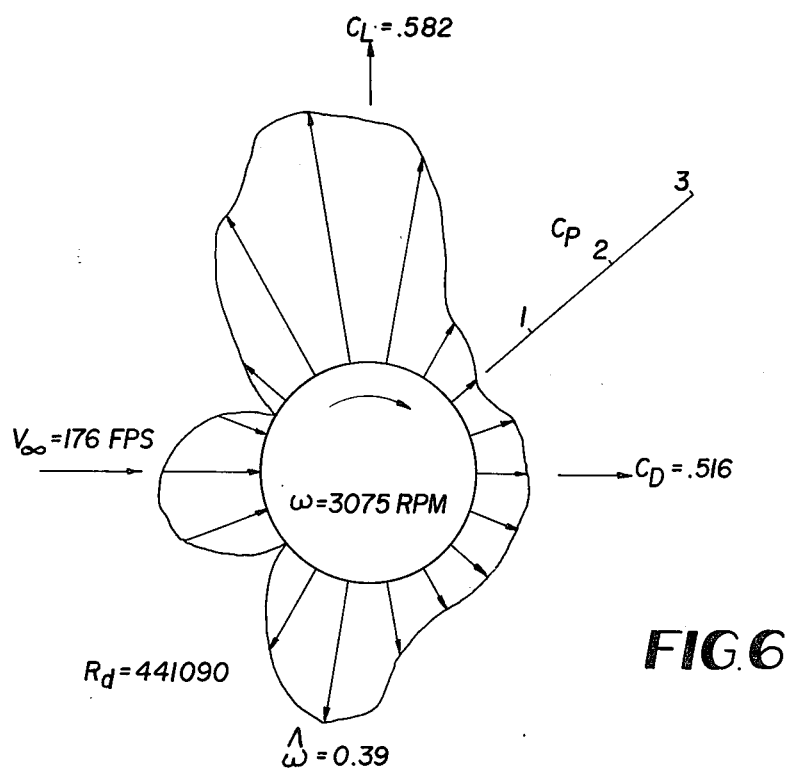
FIG. 6 is a graphical representation of the pressure coefficients using measurements obtained from the apparatus of FIG. 5.

The pressures of the measurements can then be reduced to coefficient form and presented graphically wherein the magnitude of the pressure coefficient at each circumferal location is denoted by a proportional length arrow emanating from the outline of the cylindrical model. The pressure distribution for each run can be integrated over the surface of the cylinder to obtain the resultant lift and drag coefficients. FIG. 6 shows data for a tip speed ratio of 0.39, which is beyond the unstable region and a turbulent boundary layer is established in both the upper and lower surfaces. The force coefficient values determined by integrating the pressure data obtained by the present invention were a lift coefficient of 0.582 and a drag coefficient of 0.516. Data obtained by force tests of prior art devices for the same tip speed show a lift coefficient of 0.58 and drag coefficient of 0.510.

Thus it can be seen that the apparatus of the present invention provides measurements as accurate as those of prior art devices. The present technique of the present invention can be applied to a number of model configurations, model orientation to air flow (angle of attach and yaw), and speed regimes including subsonic, transonic, supersonic and hypersonic. The apparatus functions well with irregular shaped surfaces so as to investigate specific Magnus related problems including the boat tail area of a spin stabilized projectile, tail region of a fin stabilized missile, and the nose portion of spinning bodies.

The detailed understanding of the Magnus effect has been hampered by the total lack of definite experimental data describing the pressure distribution on the surface of spinning bodies as noted by W. M. Swanson in the Journal Basic Engineering, Transactions of the ASME, September 1961, pp. 461–470. The present invention will provide pressure data which could provide a key element in assessing the flow field and boundary layers interaction and resulting Magnus forces as they affect future projectile design and flight performance.

It is obvious from the description of the preferred embodiments that the objects of the invention are obtained to provide instrumentation for measuring the pressure across the surface of an aerodynamic spinning body never before achieved by the prior art.

I wish it to be understood that I do not desire to be limited to the exact description of the construction described and shown for obvious modifications can be made by persons skilled in the art.

What is claimed:

1. Apparatus for measuring surface pressure on a spinning body in an aerodynamic chamber comprising:
   a shell means having the configuration of said body and at least one aperture through the surface of said shell means;
   first positioning means connected to said shell means for rotating said shell means about the shell means' longitudinal axis;
   sensor means having a cavity in the interior of said shell means and aligned along said longitudinal axis with said aperture and a pressure transducer connected to said cavity, said sensor means measure the pressure at the point on the shell means surface defined by the radial alignment of said cavity and aperture.

2. The apparatus according to claim 1 including a second positioning means connected to said sensor means for rotating said sensor means about said longitudinal axis.

3. The apparatus according to claim 1:
wherein said shell means includes a plurality of apertures spaced along said longitudinal axis; and
including a third positioning means connected to said sensor means for moving said cavity into axial alignment with a selected aperture.

4. The apparatus according to claim 1 wherein said transducer is positioned exterior to said chamber and is connected to said cavity by a conduit interior to said shell means.

5. The apparatus according to claim 1 including a core supported exterior to said chamber, said cavity is mounted within said core, and said shell means rotationally rides on said core.

6. The apparatus according to claim 5 including second positioning means for rotating said core about said longitudinal axis to vary the radial position of said cavity, and wherein said apparatus is adjustably mounted relative to said chamber for varying angle of attack.

7. The apparatus according to claim 1 wherein said cavity includes seal means for creating a sliding fluid tight seal between said cavity and the interior surface of said shell means.

8. The apparatus according to claim 7 wherein said seal means includes an O-ring and biasing means for pressing said O-ring against the interior of said rotating shell means.

9. The apparatus according to claim 7 wherein said seal means includes magnetic means surrounding said cavity and a magnetic fluid controlled by said magnetic means to form a seal between said cavity and said shell means.

10. The apparatus according to claim 1 wherein said shell means includes a plurality of apertures and said sensor means includes a plurality of cavities spaced longitudinally.

* * * * *